United States Patent [19]

Patterson et al.

[11] Patent Number: 4,705,434

[45] Date of Patent: Nov. 10, 1987

[54] SCALLOPED POLYGONAL CUTTING INSERT

[75] Inventors: John H. Patterson, Hazel Park; Thomas J. Bernadic, Madison Heights, both of Mich.

[73] Assignee: GTE Valenite, Troy, Mich.

[21] Appl. No.: 944,789

[22] Filed: Dec. 22, 1986

[51] Int. Cl.⁴ .............................................. B23B 27/22
[52] U.S. Cl. ..................................... 407/114; 407/116
[58] Field of Search ................ 407/113, 114, 115, 116

[56] References Cited

U.S. PATENT DOCUMENTS

| | | | |
|---|---|---|---|
| 3,395,434 | 8/1968 | Wirfelt | 407/114 |
| 4,335,984 | 6/1982 | Zweekly | 407/114 |
| 4,465,412 | 8/1984 | Zweekly | 407/114 |
| 4,606,678 | 8/1986 | Zweekly | 407/114 |
| 4,606,679 | 8/1986 | Jeremias | 407/114 |
| 4,626,140 | 12/1986 | Zweekly | 407/114 |

Primary Examiner—Nicholas P. Godici
Assistant Examiner—Jerry Kearns
Attorney, Agent, or Firm—Robert E. Walter

[57] ABSTRACT

In polygonal cutting insert, each of the respective parallel faces of the insert include a single chip breaker scallop positioned at each corner wherein the scallop is formed as segments of conical frustum having a particular orientation.

1 Claim, 2 Drawing Figures

SCALLOPED POLYGONAL CUTTING INSERT

BACKGROUND OF THE INVENTION

The present invention relates to disposable cutting inserts which may be detachably mounted on a tool holder for cutting a work piece. Cutting inserts of this type are generally made of cemented metal carbide and are formed by pressing and sintering techniques.

In the type of cutting inserts referred to herein, it is desirable to have an indexable insert which presents a positive rake cutting edge to the working piece.

U.S. Pat. No. 3,885,281 to Stambler describes an insert having both longitudinally curved and transversally curved channels along the side edges of the insert meeting at the corners of the insert. At each corner of the insert, V-shaped shallow grooves are depressed into the merging portions of the deeper longitudinal channels to provide chip control for shallow depth cuts.

U.S. Pat. No. 3,786,541 to Lundgren relates to a cutting insert having chip breakers into two stages wherein the cutting edge and the associated chip breaker describe a curve of a particular description.

U.S. Pat. No. 3,786,540 describes an insert having chip control groove extending along a side surface. The width of the groove describes a compound curve such that the width varies along the length of the side.

U.S. Pat. No. 3,399,442 to Jones describes an insert having chip control groove along the entire outer edge comprising an inner and outer region. The outer region is concave in cross section.

U.S. Pat. No. 4,335,984 to Zweekly describes an insert having a plurality of breaking depressions in the chip breaker surface adjacent the cutting corner.

U.S. Pat. No. 4,473,480 describes a succession of chip control recesses formed on the cutting face at the outer periphery along the cutting edge. The chip control recesses are generally spherical and may intersect or contact each other as well as the cutting edge.

U.S. Pat. No. 4,215,957 discloses depressions which are generally rectangular with inner corners spaced from the cutting edge.

SUMMARY OF THE INVENTION

U.S. Pat. No. 4,606,670 to Zweekly, a co-worker of the inventor of the present invention, describes a circular chip breaking insert having a plurality of overlapping peripheral conical depressions extending to the cutting edge and including secondary conical depressions formed at the overlapping areas of the primary depressions.

In prior copending application Ser. No. 6/785,211, filed on Oct. 7, 1985, a circular chip control insert is disclosed employing peripheral scallops with chip breaking back walls intersecting on ridges of diminishing height and terminating substantially at the peripheral cutting edge.

In prior copending application Ser. No. 824,597 filed Jan. 31, 1986, there is described a special finishing threader which employs a similar chip breaking scallop principle that may be used to remove all or major portion of the thread stock in fewer passes than previously required.

In the present invention, the cutting insert has substantially parallel faces with peripheral side surfaces normal to the parallel faces. The side surfaces and faces are joined to form corners of a polygon. A pair of cutting edges extend away from each corner substantially within the plane of one of the faces. A plurality of chip breaking scallops are positioned along the cutting edges and extend inwardly and downwardly from the respective edge. Each scallop comprises a bottom surface terminating at a back surface to form a chip breaker. The bottom and back surfaces are formed as segments of conical frustrum.

In accordance the present invention, each of the respective parallel faces of the insert of the present invention include a scallop positioned at each corner. The axis of respective conical frustums forming the bottom and back surfaces is substantially positioned a plane normal to a respective face and lying along the bisector of the corner.

DETAILED DESCRIPTION OF THE DRAWINGS

DETAILED DESCRIPTION OF THE PREFERRED EMBODIMENT

Figure 2:
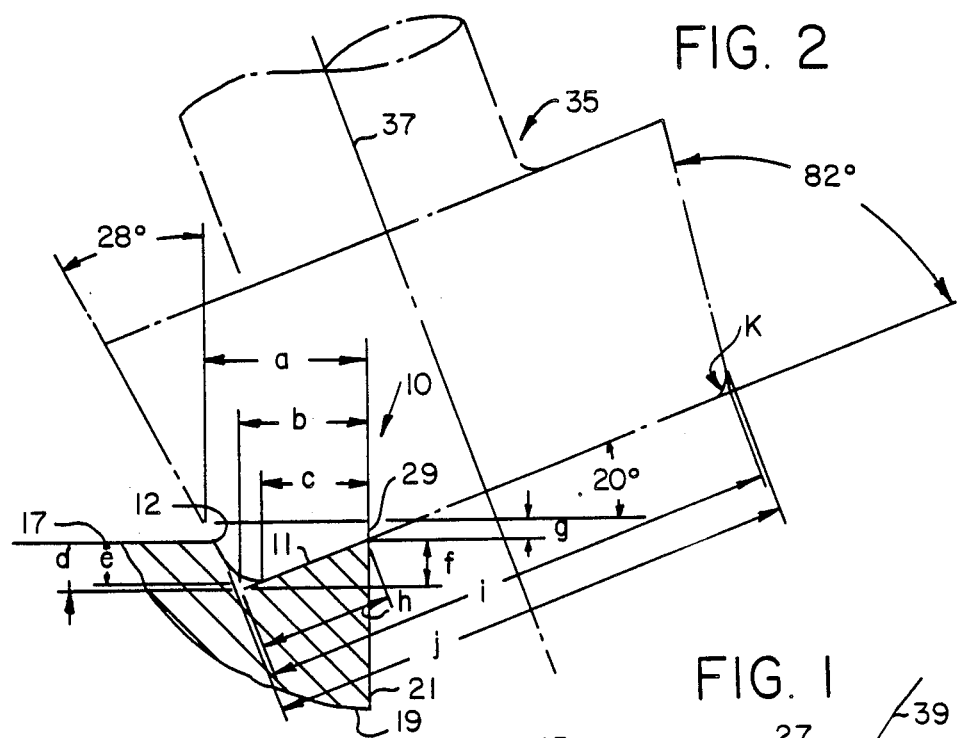
FIG. 2 is an enlarged fragmentary sectional view of a single scallop illustrating in phantom the grinder orientation for forming a master insert.
Figure 1:
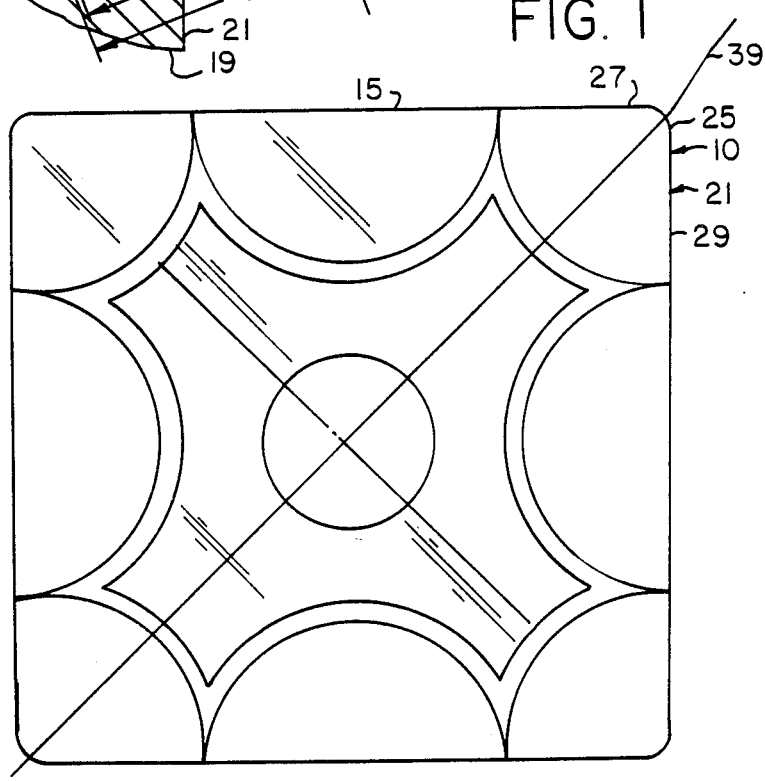
FIG. 1 is a plan view of a typical preferred embodiment of the present invention.

The cutting insert 15 has substantially parallel faces 17,19 with peripheral side surfaces 21–24, normal to the parallel faces 17,19. The faces 17,19 are joined with the side surfaces 21–24 to form eight corners at the junctions. One corner 25 is at the juncture of face 17 and side surfaces 21 and 24. The remaining corners are similarly formed. A pair of cutting edges 27,29 extend away from corner 25 substantially within the plane of a face 17. Chip breaking scallop 10 is positioned along the cutting edge 29 and extends inwardly and downwardly from edge 29. The insert 15 as shown may be provided with a plurality of scallops. It is intended that the scallops are similarly formed and the following description of a single scallop is applicable to the formation of other scallops. The scallop 10 comprises a bottom surface 11 forming a positive rake surface with the cutting edge 29. The bottom surface 11 joins and terminates at the junction with back surface or backwall 12 which also is an arcuate surface. The bottom and back surfaces 11,12 of scallop 10 are formed as segments of conical frustum.

Each scallop is preferably shaped as described in U.S. patent application Ser. No. 785,211 hereinbefore mentioned which disclosure is incorporated by reference into the present application. The form of a typical scallop is established on a master by a grinding wheel 35 as shown in phantom in the further enlarged view of FIG. 2. From this view it will be seen that the basic dimensions of the grinder or frustum 35 is such that presented with its end surface at a 20 degree angle to the face of the insert, a positive rake scallop surface 11 is formed together with a 28 degree angle of backwall 12 relative to the verticle axis of the insert. The detailed description chip breaker geometry as set forth in the prior application is incorporated by reference into the present application.

In accordance with the principles of the present invention scallop 10 and equivalent scallops are formed at a particular locations in or on insert 15. Each of the respective parallel faces 17,19 of the insert 15 includes a single scallop 10 positioned at each corner. The bottom and back surfaces 11,12 are formed by the intersection of the outer surface of the grinder 35 in the shape of a frustum with the insert 15. The grinder or frustum 35 has an axis 37 of symmetry or rotation substantially positioned a plane normal to face 17. The plane normal to the face containing the axis 37 lies along the bisector 39 of the corner 25. The bisector 39 lies on face 17 and equally divides the angle formed by cutting edges 27,29.

We claim:

1. A polygonal indexable cutting insert comprising substantially parallel faces and peripheral side surfaces normal to said parallel faces, said faces and said side surfaces being joined to form corners, a pair of cutting edges extend away from each corner substantially within the plane of a respective one of said faces, a plurality of chip breaking scallops positioned along the cutting edges and extend inwardly and downwardly from the respective cutting edge, each scallop comprises a bottom arcuate surface forming a positive rake surface and a back arcuate surface joining said bottom surface to form a chip breaker, said bottom and back surfaces of respective scallops being formed as segments of a conical frustum having an axis of symmetry, each of said respective parallel faces include a single scallop positioned at each corner wherein the axis of a conical frustum forming said bottom and back surfaces of a respective scallop is positioned substantially in a plane normal to a respective face and lying along the bisector of the corner.

* * * * *